United States Patent [19]

Yang et al.

[11] Patent Number: 6,013,594
[45] Date of Patent: Jan. 11, 2000

[54] SPRAY DRIED POLYMER FOR CATALYST SUPPORT

[75] Inventors: Henry Wu-Hsian Yang; Anthony Nicholas Speca, both of Kingwood, Tex.

[73] Assignee: Exxon Chemical Patents, Inc., Houston, Tex.

[21] Appl. No.: 09/071,294

[22] Filed: Apr. 29, 1998

Related U.S. Application Data

[63] Continuation of application No. 08/214,922, Mar. 17, 1994, abandoned.

[51] Int. Cl.[7] .............................. B01J 31/00; B01J 37/00; C08F 4/02; C08F 4/60; C08F 4/44

[52] U.S. Cl. .......................... 502/103; 502/109; 502/117; 502/152; 502/159; 502/402; 502/439; 526/124.2; 526/160; 526/901; 526/943

[58] Field of Search .................... 502/159, 109, 502/402, 439; 526/124.2, 160

[56] References Cited

U.S. PATENT DOCUMENTS

| | | | |
|---|---|---|---|
| 3,779,952 | 12/1973 | Leonard, Jr. | 502/159 |
| 4,161,462 | 7/1979 | Bocharov et al. | 502/109 |
| 4,424,138 | 1/1984 | Candlin et al. | 502/162 |
| 4,426,318 | 1/1984 | Fries et al. | 502/109 |
| 4,460,700 | 7/1984 | Candlin et al. | 526/124.2 |
| 4,465,783 | 8/1984 | McKenzie | 502/109 |
| 4,921,825 | 5/1990 | Kioka et al. | 502/104 |
| 5,015,373 | 5/1991 | Carr et al. | 502/402 |
| 5,017,714 | 5/1991 | Welborn, Jr. | 502/117 |
| 5,051,484 | 9/1991 | Sasaki et al. | 526/151 |
| 5,096,867 | 3/1992 | Canich | 502/103 |
| 5,118,648 | 6/1992 | Furtek et al. | 502/116 |
| 5,153,157 | 10/1992 | Hlatky et al. | 502/117 |
| 5,198,401 | 3/1993 | Turner et al. | 502/155 |
| 5,240,894 | 8/1993 | Burkhardt et al. | 502/108 |
| 5,461,017 | 10/1995 | Furtek et al. | 502/109 |
| 5,648,310 | 7/1997 | Wasserman et al. | 502/120 |
| 5,672,669 | 9/1997 | Wasserman et al. | 526/170 |
| 5,798,314 | 8/1998 | Spencer et al. | 502/439 |

FOREIGN PATENT DOCUMENTS

| | | |
|---|---|---|
| 1 212 058 | 9/1986 | Canada . |
| 0 071 704 A3 | 2/1983 | European Pat. Off. . |
| 0 129 368 A1 | 12/1984 | European Pat. Off. . |
| 0 277 003 A1 | 8/1988 | European Pat. Off. . |
| 0 277 004 A1 | 8/1988 | European Pat. Off. . |
| 0 327 649 A1 | 8/1989 | European Pat. Off. . |
| 0 520 732 A1 | 12/1992 | European Pat. Off. . |
| 2 423 895 | 12/1974 | Germany . |
| 254 945 A1 | 3/1988 | Germany . |
| 1 462 049 | 1/1977 | United Kingdom . |
| 93/00393 | 1/1993 | WIPO . |
| 93/11166 | 6/1993 | WIPO . |
| 97/48732 | 12/1997 | WIPO . |

OTHER PUBLICATIONS

"Microencapsulation," Kirk–Othmer, Encyclopedia of Chemical Technology, 3rd Edition, vol. 15, p. 475–476.

"Size Enlargement," Kirk–Othmer, Encyclopedia of Chemical Technology, 3rd Edition, vol. 21, p. 96–99.

"Crystallization," Kirk–Othmer, Encyclopedia of Chemical Technology, 3rd Edition, vol. 7, p. 262.

*Primary Examiner*—Mark L. Bell
*Assistant Examiner*—J. Pasterczyk
*Attorney, Agent, or Firm*—Catherine L. Bell; William G. Muller; Joseph F. Reidy

[57] ABSTRACT

This invention relates to catalyst supports made by spray drying an emulsion polymerized latex and the novel supported catalysts utilizing these supports. This invention further relates to a method for forming supported catalysts by spray drying a latex of microparticles containing catalyst or catalyst components. The polymizerable monomers used in the latex are e.g. styrenes, vinyl benzenes, vinyl cyclohexane and vinyl cyclohexene and can form homo- or copolymers which may be crosslinked. The catalysts supported include metallocenes as well as Ziegler-Natta catalysts. Processes of polymerizing olefins using such catalysts are also described.

10 Claims, 3 Drawing Sheets

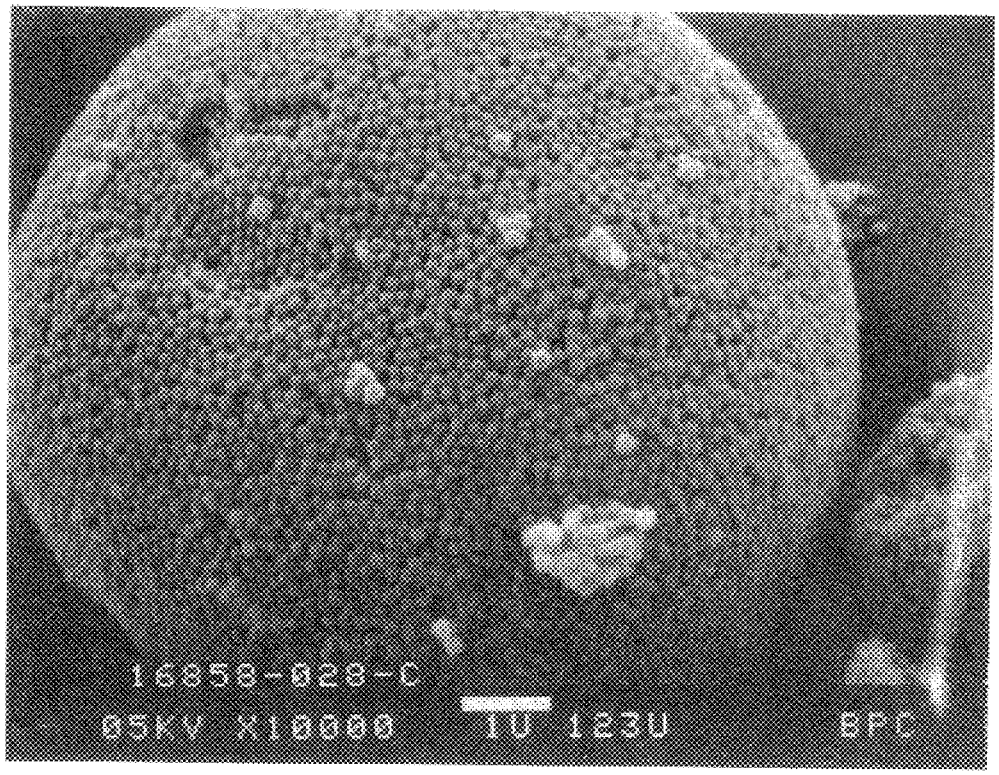
Figure

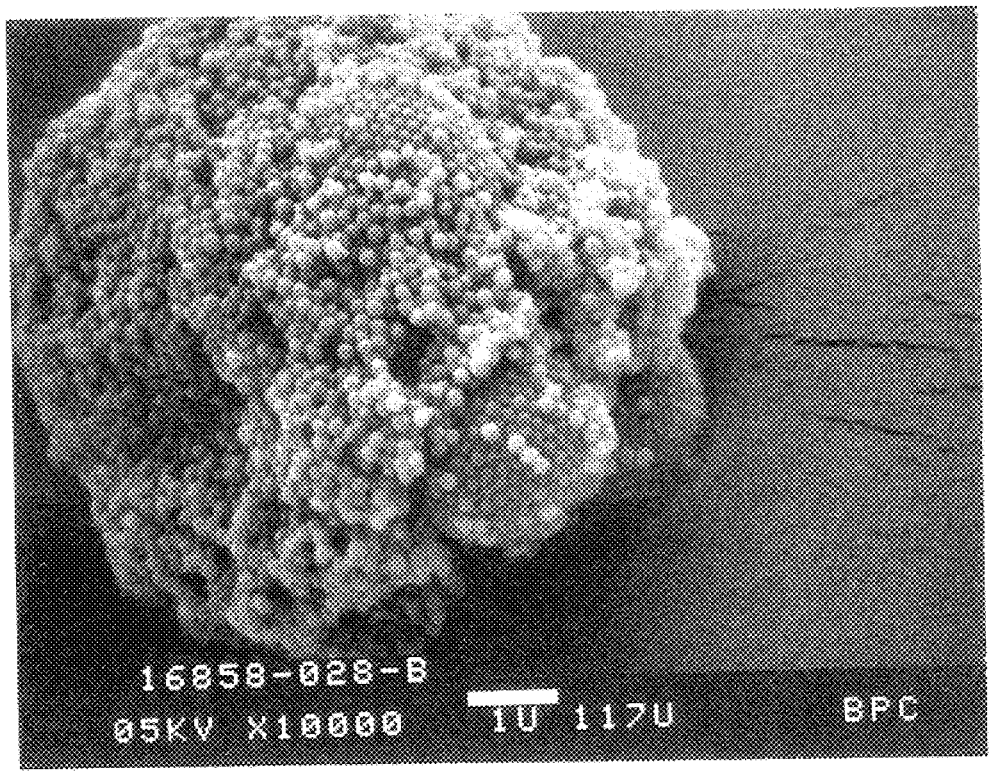

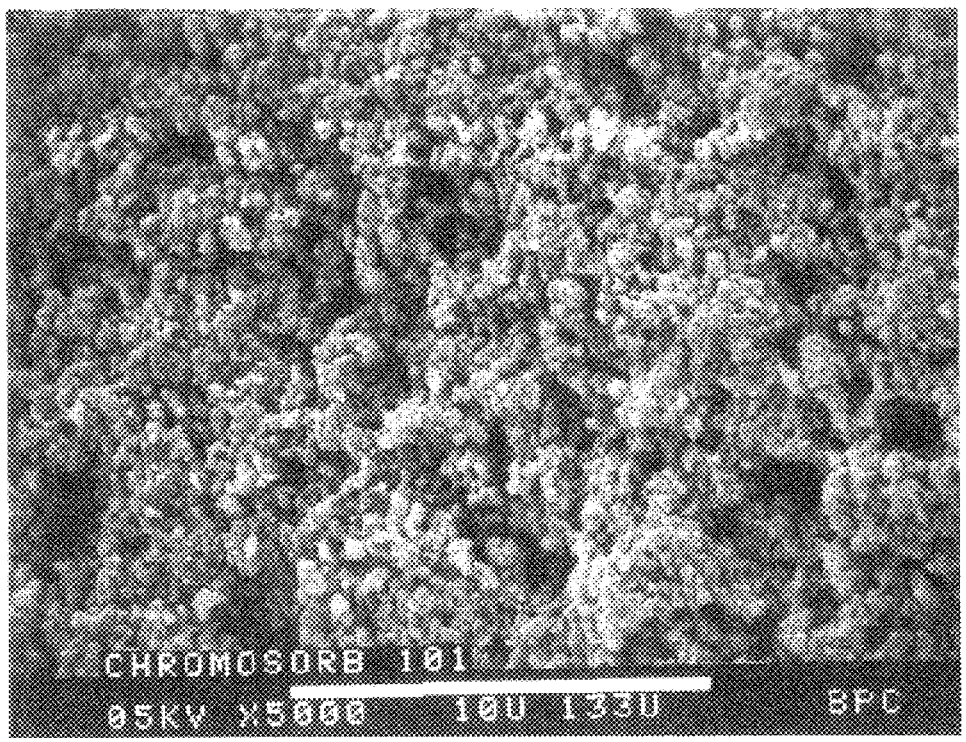
Figure

SPRAY DRIED POLYMER FOR CATALYST SUPPORT

This is a continuation, of application Ser. No. 08/214,922, filed Mar. 17, 1994, now abandoned.

FIELD OF THE INVENTION

This invention relates to polymeric macroparticles, a method of utilizing them as catalyst supports, and a method to make the supports by spray drying the microparticles with or without catalyst.

BACKGROUND OF THE INVENTION

Spray drying offers an opportunity to control the particle size of an inorganic support and a supported catalyst, which in turn is used to control particle size and final polymer product properties in gas phase polymerization. Silica, a favorite catalyst support, is typically spray dried to obtain certain ranges of particle sizes and distributions. Similarly, catalyst systems themselves are spray-dried. For example, U.S. Pat. No. 4,424,138 discloses a solution having a solid component, an agglomeration enhancer of dissolved polystyrene and other components spray dried for use as a polymerization catalyst in gas phase.

It is also known that polymers can be used as catalyst supports since they are less susceptible to typical catalyst killing impurities such as, for example, water and oxygen. Supported porous polymer particles having pore sizes of 10 angstroms are disclosed as supports in U.S. Pat. No. 5,118,648. (See also U.S. Pat. No. 5,051,484 and U.S. Pat. No. 4,921,825 for polymeric supports.) These "spongy" polymeric supports, however, do not provide uniform pore sizes, which in turn can lead to reactor fouling and other undesired events.

There has been a need for a method to produce small particle size organic polymer supports having good pore size distribution for use as catalyst supports.

BRIEF SUMMARY OF THE INVENTION

This invention relates to porous polymeric catalyst supports comprising agglomerates (macroparticles) of polymer microparticles, said microparticles having an average diameter of about 0.005 to about 5.0 micrometers. This invention further relates to catalyst supports comprising polymeric agglomerates of particles of about 0.005 to about 5.0 micrometers and combinations thereof with catalysts or catalyst components. Likewise, this invention also relates to methods of preparing porous polymeric supports and supported catalysts by spray drying, preferably spray drying an emulsified composition.

BRIEF DESCRIPTION OF THE DRAWINGS

FIG. 1 is an electron micrograph of a polystyrene bead that was emulsion polymerized and then spray dried.

FIG. 2 is an electron micrograph of a polystyrene/MgCl$_2$ bead. The polystyrene was emulsion polymerized, combined with the MgCl$_2$, then spray dried.

FIG. 3 is an electron micrograph of CHROMOSORB 101™.

DETAILED DESCRIPTION OF THE INVENTION

In a preferred embodiment, this invention relates to a porous polymeric catalyst support comprising agglomerates of polymer microparticles of uniform size, said microparticles having an diameter of about 0.005 to about 5.0 micrometers.

Preferred embodiments of this invention relate to porous polymeric supports, preferably spray dried supports and a method for preparing supports comprising spray drying a suspension of 0.005 to 5.0 micrometer polymer particles (microparticles). In preferred embodiments, the microparticles are combined with catalyst or catalyst components before or after spray drying.

Preferred polymer microparticles are about 0.005 to about 5.0 micrometers in diameter, preferably 0.1 to 2.0 micrometers, when in the liquid media and upon spray drying agglomerate into larger particles (macroparticles) of up to about 300 micrometers, preferably about 10 to about 150 micrometers, even more preferably about 20 to about 90 micrometers. In a preferred embodiment, the microparticles are substantially uniform in size, i.e. the particle sizes have a standard deviation of less than about 20%.

Likewise, the microparticles may be formed in situ or may be combined with the liquid media prior to spray drying. The polymer microparticles, can be purchased from chemical suppliers or can be prepared by known emulsion polymerization techniques, such as those disclosed in *Principles of Polymerization*, by George Odian, McGraw-Hill Publishers, 2nd. ed. 1981, which is incorporated by reference herein. The microparticles can be prepared, for example, by (1) placing a monomer, such as an acrylate, a styrene or the like, into water with a surfactant, and (2) adding a free radical initiator such as a peroxide to begin the polymerization. The different particle sizes (between 0.005 to 5.0 micrometers) can be obtained by varying the amount of surfactant used in the emulsion and other methods known to those of skill in the art.

Preferred monomers used in preparing microparticles of this invention are those that are emulsion polymerizable including but not limited to alkyl styrenes and alkyl (meth) acrylates, wherein the alkyl groups have from about 1 to about 40 carbon atoms, more preferably from 1 to 20 carbon atoms. Examples of preferred monomers include styrene, alpha-methylstyrene, methylstyrene, para-chlorostyrene, para-methylstyrene, acrylic acid, 2-ethyl-hexyl acrylate, vinyl versatate, vinyl chloride, vinyl acetate, methyl acrylate, methyl methacrylate, ethyl acrylate, glycidylmethacrylate, divinylbenzene, butyl acrylate, n-octyl acrylate, vinylidene chloride, acrylamide, 2-hydroxy-ethyl-acrylate, methyl acrylic acid, vinyl cyclohexane, vinyl cyclohexene and the like. The phrase alkyl (meth)acrylates is herein defined to mean both alkyl acrylates and alkyl meth-acrylates.

Further, the inclusion of monomers that are capable of crosslinking, such as alpha, omega-dienes, is also preferred in some embodiments. These monomers provide the capability of crosslinking the polymer within the microparticles. This may be desirable when the polymeric microparticles and the agglomerations are soluble in the solvent of choice for a particular catalyst. Cross-linking the microparticles results in the polymer becoming insoluble. In preferred embodiments the crosslinkable comonomers are present in the polymer at up to about 25 weight percent, based upon the weight of the polymer, preferably about 2 to about 20 weight percent, even more preferably, 2 to 10 weight percent. Preferred crosslinkable monomers include alpha, omega-dienes, non-conjugated dienes and di- or multi-functional monomers having up to about 200 carbon atoms, and may comprise linear, branched or cyclic structures. Examples of preferred monomers include butadiene, diacrylate, divinyl benzene, triacrylate, 1,5- hexadiene, 1,6-heptadiene, 1,7-octadiene.

Likewise any polymer that may be formed into microparticles of an average size of about 0.005 to about 5.0 micrometers, preferably 0.1 to 2.0, may also be used in the practice of this invention.

In preferred embodiments the microparticles are suspended in a liquid media, such as water or a hydrocarbon diluent, and spray dried to form the agglomerated support. In a further preferred embodiment, the microparticles are suspended in a liquid media and then combined with catalyst or catalyst components and then spray dried. This forms a supported catalyst, or supported catalyst components, respectively. In another preferred embodiment, the agglomerated support is combined with cyclopentadienyl transition metal compounds, an alumoxane, an aluminum alkyl or a non-coordinating anion and allowed to remain in solution for 1 minute to an hour to allow enough time for the catalyst or component to "load" onto the support and may even be optionally heated. Loading is performed by standard techniques known in the art.

In a particularly preferred embodiment the microparticles of polymer are combined in liquid medium with one or more of cyclopentadienyl transition metal compounds, an alumoxane, an aluminum alkyl or a non-coordinating anion and thereafter spray dried. Preferred cyclopentadienyl transition metal compounds, alumoxanes and non-coordinating anions are those disclosed in U.S. Pat. No. 5,055,438; U.S. Pat. Nos. 5,657,415; 5,096,867; 5,017,714; 5,240,894; 5,153,157, EPA 520,732, published Dec. 30, 1992; 129,368, published Dec. 27, 1984 and 277,003, 277,004, published Jun. 3, 1988; U.S. Ser. No. 542,236 filed Jun. 22, 1990; U.S. Ser. No. 468,382 filed Feb. 28, 1990; U.S. Ser. No. 737,611 filed Jul. 19, 1991; U.S. Ser. No. 926,006 filed Aug. 5, 1992, which are herein incorporated by reference.

In general these catalysts comprise two parts: a first component of a transition metal compound, preferably a cyclopentadienyl derivative of a group 4, 5 or 6 transition metal, even more preferably a mono- or bis-cyclopentadienyl derivative, and a second component of an alumoxane or a non-coordinating anion. In particularly preferred embodiments the first component is a mono-cyclopentadienyl (mono-Cp) group 4 transition metal compound or a bis-cyclopentadienyl (bis-Cp) group 4 transition metal compound. Titanium, zirconium and hafnium are preferred group 4 metals. The second component is an alumoxane or a non-coordinating anion. Preferred alumoxanes include methylalumoxane. Preferred non-coordinating anions include N,N dimethylanilinium tetrakis (pentaflourophenyl)borate.

In a preferred embodiment, the cyclopentadienyl compound and/or the alumoxane and/or the non-coordinating anion are combined in a hydrocarbon media with the microparticles and thereafter spray dried.

Likewise, in another preferred embodiment one or more components of a traditional Ziegler-Natta catalyst is placed in a liquid media with the microparticles prior to spray drying. Traditional Ziegler-Natta catalysts which may be combined with the microparticles before spray drying or combined with the polymer particle agglomerates after polymerization are discussed in "Ziegler-Natta Catalysts and Polymerizations," by John Boor, Jr., Academic Press, New York, 1979, and "Isospecific Polymerization of Olefins: With Heterogeneous Ziepler-Natta Catalysts," by Y. V. Kissin, Springer-Verlag, New York, 1985, both of which are incorporated by reference herein. Typically these catalysts comprise at least two components: a transition metal component and an organo-aluminum component. The transition metal component is typically a group 4, 5 or 6 transition metal component, all references to the periodic table being to the version published in Chemical and Engineering News, 63 (5), 27, 1985. The organo-aluminum component is typically an aluminum alkyl and is preferably an aluminum alkyl halide, having 1 to 40 carbon atoms in the alkyl group. As described above these components may be combined together or separately with the micro- or macro- particles before or after spray drying in any number of combinations that will occur to those of ordinary skill in the art having the benefit of this disclosure.

In addition, catalyst precursors can be loaded onto the supports or suspended in the emulsion media prior to spray drying to form a supported composition that can thereafter be treated to form the catalyst or catalyst component.

In a preferred embodiment, the 0.005 to 5.0 micrometer size polymeric particles are suspended in a liquid media and then spray dried to remove the liquid. This produces hexagonally close packed macroparticles (agglomerates) on the drying surface. (Examples of drying surfaces are teflon films, walls and any surface in between.) The macroparticles are preferably about 2 to about 300 micrometer in diameter, more preferably 10 to 150 micrometers, even more preferably 20 to 90 micrometers in diameter. These hexagonally closed packed particles are then exceptionally useful as supports for catalysts or catalyst components. Typically, the pore sizes of the agglomerates are determined by the sizes of the microparticles. Thus, in a preferred embodiment, the pore sizes are substantially uniform across the agglomerate or macroparticle, when the microparticles are of substantially the same size. This of course is not the case in some embodiments when microparticles of more than one size are selected and combined for spray drying together.

It is also contemplated by this invention that supports having different pore sizes could be combined to form the catalyst support.

One of ordinary skill in the art will recognize the use of the phrase substantially uniform above is meant to exclude wide variations in sizes, while allowing statistical variations, i.e. having a standard deviation of less than about 20%. In a particularly preferred embodiments, the pore sizes are substantially uniform and have an average diameter of between about 50 and about 50,000 nanometers.

The dried polymer can be treated as any other typical catalyst support, for example dehydrated. In a preferred embodiment the microparticles and/or spray dried supports of this invention are substituted for the silica supports in U.S. Pat. No. 5,240,894, which is herein incorporated by reference. In another embodiment of this invention, a suspension of microparticles in water is freeze dried or mixed with electrophilic hydrocarbons, to remove the water without causing agglomeration into macroparticles. The microparticles may then be suspended in hydrocarbon or the like, with hydrocarbon soluble or suspended catalysts and/or components and then spray dried.

In another preferred embodiment of this invention the microparticles form supports that have pore radius sizes that are relatively uniform and may be up to about 100,000 nanometers, preferably from about 50 to about 50,000 nanometers, even more preferably about 1500 to about 5000 nanometers.

In a preferred practice of this invention, an emulsion polymerized polymer is suspended in a liquid medium such as water, alcohol, hexane and the like, and is forced at high pressure through a small orifice onto a surface. The deposited polymer is allowed to dry, or otherwise separated from the liquid medium, and the resulting polymer macroparticles, usually of up to 300 micrometers in size, are preferably dried and used as a polymeric catalyst support.

Drying techniques include heat, vacuum, freeze drying, evaporation, and the like. The polymer is preferably dried to a free flowing state, collected and used as a support.

Preferred liquid media depend on the desired end product and the steps necessary to attain it. For example, $MgCl_2$, a typical Ziegler-Natta catalyst support component, is soluble in water and can be simply added to the products of a preceding emulsion polymerization and then spray dried or added, after the emulsified polymer particles are spray dried, to the macroparticles in water or another liquid media.

In contrast, alumoxanes, especially methyl-alumoxane, are desirably kept in a water and oxygen-free environment. In this situation, the microparticles may be separated from a water emulsion latex in such a way as to prevent agglomeration into macro-particles (i.e., freeze dried), then resuspended in microparticle form in a hydrocarbon or other non-water medium with the alumoxane, and thereafter spray dried.

Preferred liquid media include water, hydrocarbons, and the like. The hydrocarbons may be any linear, cyclic or branched, substituted or unsubstituted $C_1$ to $C_{100}$ hydrocarbon. Preferred examples include pentane, hexane, toluene, xylene, cyclopentane, methyl cyclopentane, benzene, methyl chloride, and the like. Care should be exercised in selecting media for particular supports and catalyst components. For example, alumoxanes and cyclopentadienyl compounds are sensitive to water and air, and thus are preferably suspended in a hydrocarbon media.

In another preferred embodiment, the spray dried polymer support is dehydrated to drive off all moisture and/or residue liquid medium. This dried support is then contacted with a liquid medium containing catalyst, catalyst component or catalyst precursor. This combination may then be dried such that the catalyst and/or catalyst component is deposited on or in the polymeric support. Likewise, this invention also contemplates placing the catalyst, catalyst component or catalyst precursor to be supported into the emulsion prior to polymerization or addition to the emulsion after polymerization but before spray drying. Further, the catalyst, catalyst component or catalyst precursor to be supported may be added onto the aggregate prior to spray drying or addition to the aggregate after spray drying.

Likewise, the polymer particle may be "dried" several times. For example, the emulsified polymer is freeze dried to a water free state, suspended in an alcohol then spray dried to achieve a final aggregate form.

In another embodiment, the microparticles could be isolated as dry, free flowing powder and slurried in hydrocarbon liquid. The microparticles will then be impregnated with catalyst precursor material by surface absorption or the microsticles could be added to $MgCl_2$ dissolved in an alcohol or an ether and then spray dried to form the macroparticles. The supported catalyst can then be used in the gas phase, slurry phase or high pressure polymerization of olefin. For example, $MgCl_2$ will be added to the water medium followed by spray drying to form the aggregates. The result will be homogeneous distribution of $MgCl_2$ in the intersticies of the primary micro-particles comprising the final aggregates. The $MgCl_2$ loaded aggregates will be isolated as dry, free flowing powder and slurried in hydrocarbon liquid after which Ziegler-Natta catalyst preparation will proceed using techniques well known in the art. In another case, hydrated $Al_2(SO_4)_3$ will be added to the water medium followed by spray drying to form the aggregates. These will be separated and added to a hydrocarbon solution of trimethylaluminum to form methyl-alumoxane (MAO) in situ. The MAO loaded aggregates will be the basis for numerous metallocene catalyst preparations.

Spray Drying

In general, spray drying is a known technique that can be practiced in a variety of ways. Of the many methods and equipment available to spray dry a substance the inventors will only list a few here for convenience and brevity. However this in no way should be construed as limiting the invention. Some known commercial spray dryers are manufactured by Niro Atomizer, Inc., Beckman, Stork-Bowen Engineering, Inc. and Swenson Process Equipment. Further information on spray drying techniques is located at page 96 to 99 in volume 21 of the Kirk-Othmer Encyclopedia of Chemical Technology, 3rd Ed. published by John Wiley and Sons, New York; and in *Impact of Spray Dryer Design on Powder Properties*, Masters, Keith (Niro/Soeborg DK-2860, Den.) Drying 91, [Sel. Pap. Int. Drying Symp.] 7th meeting date 1990, 56–73; Analysis of Spray Drying Systems, Holm Petersen, J. E., Agarwal, H. C.(Larsen and Toubro Ltd, Bombay India) Chem Age India, 21(3) 227–34, 1970; and Spray Drying: A Traditional Process for Advanced Applications, Shaw, Fred, AM.Ceram. Soc. Bull., 69(9) 1484–9, 1990, all of which are incorporated by reference herein.

The size of the agglomeration particle, i.e., the dried particle of emulsion polymerized polymer, can be controlled by varying the nozzle size, pressure, and shear rates and the like, of the spraying apparatus.

Similarly, the emulsion polymer microparticle size can be controlled by manipulating the polymerization conditions, such as surfactant concentration, polymerization rate, catalyst or initiator concentration, reaction temperature and the like. Specifically, one of ordinary skill in the art will appreciate that the many known emulsion polymerization techniques, such as emulsion, micro-emulsion, mini-emulsion and the like can all be used in the practice of this invention.

Both conventional hot air drying and fluid energy mill drying can be used.

The supports of this invention have the advantage of producing polymer with extremely good composition distribution, particle size, particle morphology and particle size distribution. In preferred embodiments the polymer product has a composition distribution breadth index (CDBI) of greater than 50%, preferably greater than 60%, even more preferably greater than 80%. Further, the polymer products have good morphology, granular, powdery or better and high bulk density. Further, the particle size distribution is narrow. Indeed, the use of emulsion polymerized polymers, which characteristically have very small and controlled particle sizes when compared to silica gel or metal oxide supports leads to exceptional final product properties. Composition distribution is defined and described in PCT Publication WO 930393, published Feb. 18, 1993, which is incorporated by reference herein.

An advantage of using the supported catalyst of current invention is to have better control of the physical properties of the olefin polymerization catalyst and the final polymer products. Loading each primary particle with catalyst precursor will ensure a homogeneous physical distribution of active catalyst to yield product particles without internal voids and having high internal bulk density. Furthermore, the ability to synthesize the final catalyst on/in the primary particles prior to forming the aggregates could reduce the chemical diversity of catalyst active sites and improve the composition distribution of copolymer products. Additionally, the ability to control the shape, particle size and size distribution of the aggregates will yield spherical product particles free of fines and with excellent flow, packing and bulk density properties. Elimination of pelletizing could also be possible.

The thus supported catalysts may be used to polymerize olefins, preferably $C_2$ to $C_{30}$ α-olefins, even more preferably ethylene, propylene, butene, hexene, octene alone or in combination with other monomers in gas, bulk, solution, slurry and high pressure phases, preferably in gas phase.

The examples below are for illustration purposes only and are not meant to limit the scope of this invention.

EXAMPLES 35 g of styrene, 0.8 g of Vinol $_{523}$™ (a polyvinyl alcohol manufactured by Air Products, Allentown, Pa.), 0.26 g of Aerosol OT and 0.1 g of 2,2'-azobis (2-methyl-propionitrile) (AMPN) initiator were placed in 65 g of water in a one liter reactor and allowed to react for 5 hours at 50 degrees C. A latex emulsion of 0.05 to 2.0 micrometer particles was formed. The sample was divided in half. The first component was spray dried using a Buchi laboratory spray drier set at a chamber temperature of 150° C. 6 weight percent of MgCl2 was dissolved into the second sample with mild agitation until completely dissolved. The second sample was then spray dried in the same manner as the first. FIG. 1 is an electron micrograph of the first sample and FIG. 2 is an electron micrograph of the second sample. Note the uniformity of the microparticles and their agglomeration into larger macro-particles in FIG. 1.

As is apparent from the foregoing general description and the specific embodiments, while forms of the invention have been illustrated and described, various modifications can be made without departing from the spirit and scope of the invention. Accordingly, it is not intended that the invention be limited thereby.

We claim:

1. A supported olefin polymerization catalyst or catalyst component comprising a porous polymeric support of spray dried emulsion polymerized latex and an olefin polymerization catalyst, wherein said polymeric support is an agglomerate of polymer microparticles having an average diameter of 0.005 to 5.0 micrometers.

2. The supported catalyst or catalyst component of claim 1 wherein the polymer microparticles are homopolymers or copolymers of styrene.

3. The supported catalyst or catalyst component of claim 1 wherein the polymer microparticles are polymers of one or more of styrene, alpha-methylstyrene, methylstyrene, paramethylstyrene, divinylbenzene, vinyl cyclohexane and vinyl cyclohexane.

4. The supported catalyst or catalyst component of claim 2 wherein the polymers are cross-linked with up to 25 weight percent of a cross-linkable comonomer, based on the weight of copolymer.

5. The supported catalyst or catalyst component of claim 3 wherein the polymers are cross-linked with up to 25 weight percent of a cross-linkable comonomer, based on the weight of copolymer.

6. The supported catalyst of claim 1 wherein said olefin polymerization catalyst comprises a cyclopentadienyl Group 4 transition metal compound and an alumoxane or a non-coordinating anion.

7. The supported catalyst of claim 1 wherein said olefin polymerization catalyst comprises a group 4, 5, or 6 transition metal compound and an organoaluminum or $MgCl_2$ compound.

8. A process for polymerizing olefins comprising contacting olefin monomer and the supported catalyst or supported catalyst component of claim 1 in gas phase, slurry phase, or high pressure in a polymerization zone under polymerization conditions.

9. A process for polymerizing olefins comprising contacting olefin monomer and the supported catalyst or supported catalyst component of claim 2 in gas phase, slurry phase, or high pressure in a polymerization zone under polymerization conditions.

10. A process for polymerizing olefins comprising contacting olefin monomer and the supported catalyst or supported catalyst component of claim 6 in gas phase, slurry phase, or high pressure in a polymerization zone under polymerization conditions.

* * * * *

UNITED STATES PATENT AND TRADEMARK OFFICE
CERTIFICATE OF CORRECTION

PATENT NO. : 6,013,594
DATED : January 11, 2000
INVENTOR(S) : Henry Wu-Hsian Yang, Anthony Nicholas Speca It is certified that error appears in the above-identified patent and that said Letters Patent are hereby corrected as shown below:

Claim 3, column 8, line 12: replace "vinyl-cyclohexane" with --vinyl cyclohexene--

Signed and Sealed this

Twenty-fourth Day of April, 2001

Attest:

NICHOLAS P. GODICI

Attesting Officer

Acting Director of the United States Patent and Trademark Office